United States Patent
Kanzawa et al.

(10) Patent No.: US 6,513,120 B2
(45) Date of Patent: *Jan. 28, 2003

(54) SECURITY SYSTEM FOR TRANSMISSION DEVICE

(75) Inventors: Hiroshi Kanzawa, Kawasaki (JP); Kazuhiro Hata, Yokohama (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,630

(22) Filed: Nov. 17, 1998

(65) Prior Publication Data

US 2002/0194507 A1 Dec. 19, 2002

(30) Foreign Application Priority Data

Mar. 10, 1998 (JP) .......................... 10-057594

(51) Int. Cl.⁷ ............................... G06F 11/30
(52) U.S. Cl. ....................... 713/201; 709/223
(58) Field of Search .................. 713/200, 201, 713/202; 709/227, 228, 223, 224; 714/25, 40, 43, 48, 49

(56) References Cited

U.S. PATENT DOCUMENTS

| | | | | | |
|---|---|---|---|---|---|
| 5,153,917 A | * | 10/1992 | Kato | ............................ | 713/200 |
| 5,321,813 A | * | 6/1994 | McMillen et al. | ........... | 714/798 |
| 5,495,411 A | * | 2/1996 | Ananda | ........................ | 705/32 |
| 5,548,645 A | * | 8/1996 | Ananda | ........................ | 705/52 |
| 5,638,513 A | * | 6/1997 | Ananda | ........................ | 713/202 |
| 5,696,898 A | * | 12/1997 | Baker et al. | ................. | 713/201 |
| 5,896,497 A | * | 4/1999 | Halstead | ...................... | 713/200 |
| 5,911,777 A | * | 6/1999 | Heredia | ....................... | 713/200 |
| 5,991,881 A | * | 11/1999 | Conklin et al. | .............. | 713/201 |
| 6,026,492 A | * | 2/2000 | Cromer et al. | ............... | 713/202 |
| 6,105,136 A | * | 8/2000 | Cromer et al. | ............... | 713/201 |
| 6,330,690 B1 | * | 12/2001 | Nouri et al . | .................. | 714/23 |
| 2002/0019948 A1 | * | 2/2002 | Katou et al. | ................. | 713/202 |

FOREIGN PATENT DOCUMENTS

| | | |
|---|---|---|
| JP | 62-213338 | 9/1987 |
| JP | 7-264178 | 10/1995 |

OTHER PUBLICATIONS

"HP's new interconnect manager increases network uptime, provides unparalleled management of switched networks." Feb. 26, 1996, Business Wire. Dialog Text Search, p. 1–2.*

"GV3000/SE AC bookself drive software reference manual" Version 6.06, Chapter 5, p. 5.1–5.10.*

"Overview of the Module" http://support.3com.com/infodeli/tools/ . . . tml/nb2hw/modules/fastent/overview.htm, p. 1–3.*

"Novell documentation: ODI and CIOS LAN test tools–test descriptions" wysiwyg://text.28/http://developer.nove . . ./doc/lantest/lan_test/data/a3pnkuz.html, p. 1–16.*

* cited by examiner

*Primary Examiner*—Gail Hayes
*Assistant Examiner*—Christopher Revak
(74) *Attorney, Agent, or Firm*—Katten Muchin Zavis Rosenman

(57) ABSTRACT

A transmission device including an advanced security system is provided to specify an illegally operated device, inhibit the illegal operations, prevent from forgetting to unlock a log-in status by a maintenance operator, and set permitted user level for each command. The security system for a transmission device in a network is formed with plural transmission devices each including, at least, a port for a control terminal, which controls the transmission devices, when a cable disconnection is detected in a port of one transmission device, a log-in status is unlocked for the one transmission device or the other transmission devices through the port.

5 Claims, 24 Drawing Sheets

FIG. 4

| D7~D3 | D2 | D1 | D0 |
|---|---|---|---|
| Reserved Area (for functional level up) | ID | CD | CTS |

FIG. 5

| | Device (NE) | Log-in status | Used port |
|---|---|---|---|
| I — Own Node | node A | ① (connected) | control terminal |
| II — Log-in to other nodes | node B | ② (connected) | modem |
| | node C | ③ (connected) | control terminal |
| | ⋮ | ⋮ | |
| III — Log-in from other nodes | node B | ④ (connected) | — |
| | node C | ⑤ (connected) | — |
| | ⋮ | ⋮ | ⋮ |

FIG. 8

| Communication data (Overhead) | | | Data area (command section) |
|---|---|---|---|
| identifying ID (except NSAP) | Destination NSAP (node A) | Sender NSAP (node B) | Data: a log-in command to node A (EX: specifying UID:'BCD',PWD:'ABCDF') |

FIG. 9

| NO. | UID | PWD |
|---|---|---|
| 1 | AAA | AAAAAA |
| 2 | BBB | BBBBBB |
| 3 | CCC | CCCCCC |
| 4 | DDD | DDDDDD |
| 5 | ABC | AABBCC |
| 6 | <u>BCD</u> | <u>ABCDE</u> |
| 7 | ABCD | AABBCCDD |
| ⋮ | ⋮ | ⋮ |

FIG. 10

| The allowed number of failing to be set: 5 times ||||||
|---|---|---|---|---|
| NO. | Device | NSAP (Network Address) | Device ID | Counted value |
| 1 | node A | AABBCC | ABD | 0 |
| 2 | node B | BBCCDD | BCD | <u>5</u> |
| 3 | node C | CCDDEE | CDE | 2 |
| 4 | node D | DDEEFF | DEF | 2 |
| 5 | node E | EEFFGG | EFG | 3 |
| 6 | node F | FFGGHH | FGH | 0 |
| 7 | node G | GGHHII | GHI | 0 |
| ⋮ | ⋮ | ⋮ | ⋮ | ⋮ |

FIG. 13

| NO. | Device | NSAP | Status of informing a report |
|---|---|---|---|
| 1 | node A | AABBCC | − |
| 2 | node B | BBCCDD | not informed → not targetted |
| 3 | node C | CCDDEE | not informed → informed |
| 4 | node D | DDEEFF | not informed → informed |
| 5 | node E | EEFFGG | not informed → informed |
| ⋮ | ⋮ | ⋮ | ⋮ |

FIG. 18

| MESSAGES | MEANINGS OF RESPONSES |
|---|---|
| COMPLD | completely executed |
| PRTL | some of the specified parameters are unexecutable |
| DENY | a command or parameter is unexecutable because of a failure |
| RESPONSE TIMEOUT | a response can not be received within a predetermined interval |

FIG. 19

| CODE | MESSAGES | MEANINGS OF MESSAGES (CAUSES OF ERRORS) |
|---|---|---|
| ENEQ | Equipage, Not equipped | Device: a control unit is not equipped |
| ENSI | Equipage, Not equipped for setting specified information | Device: unoperatable because control unit is not equipped |
| IDRG | Input, data range error | Input Error: input data exceeds than an allowed range |
| SARB | Status, All resources busy | Status: a command can not be input and received because all resources are busy |
| SNVS | Status, Not in valid state | Status: unexecutable to control by a command according to settings of the data |
| . . . . | . . . . | . . . . |

FIG. 22

| COMMAND | | | LEVEL |
|---|---|---|---|
| Security | Setting | Command A | 4 |
| | | Command B | 4 |
| | Referring | Command A | 3 |
| | | Command B | 3 |
| Performance | Setting | Command A | 3 |
| | | Command B | 2 |
| | Referring | Command A | 2 |
| | | Command B | 1 |
| Provisioning | Setting | Command A | 4 |
| | | Command B | 2 |
| | Referring | Command A | 3 |
| | | Command B | 1 |

↑ '4'   ↑ '4'   ↑ '4'

| COMMAND | | | LEVEL |
|---|---|---|---|
| Security | Setting | Command A | 4 |
| | | Command B | 4 |
| | Referring | Command A | 4 |
| | | Command B | 4 |
| Performance | Setting | Command A | 4 |
| | | Command B | 4 |
| | Referring | Command A | 4 |
| | | Command B | 4 |
| Provisioning | Setting | Command A | 4 |
| | | Command B | 4 |
| | Referring | Command A | 4 |
| | | Command B | 4 |

FIG. 23

| COMMAND | | | LEVEL |
|---|---|---|---|
| Security | Setting | Command A | 4 |
| | | Command B | 4 |
| | Referring | Command A | 3 |
| | | Command B | 3 |
| Performance | Setting | Command A | 3 |
| | | Command B | 2 |
| | Referring | Command A | 2 |
| | | Command B | 1 |
| Provisioning | Setting | Command A | 4 |
| | | Command B | 2 |
| | Referring | Command A | 3 |
| | | Command B | 1 |

  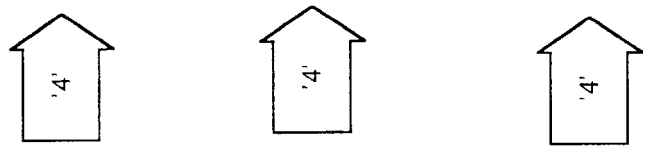

'4'   '4'   '4'

| COMMAND | | | LEVEL |
|---|---|---|---|
| Security | Setting | Command A | 4 |
| | | Command B | 4 |
| | Referring | Command A | 3 |
| | | Command B | 3 |
| Performance | Setting | Command A | 4 |
| | | Command B | 4 |
| | Referring | Command A | 2 |
| | | Command B | 1 |
| Provisioning | Setting | Command A | 4 |
| | | Command B | 4 |
| | Referring | Command A | 3 |
| | | Command B | 1 |

SECURITY SYSTEM FOR TRANSMISSION DEVICE

BACKGROUND OF THE INVENTION

1. Field of the Invention

The present invention relates to a security system for a transmission device to prevent a person not having permission from illegally accessing a network, and to find out an illegal operator as soon as possible.

2. Description of the Related Art

As information volume handled by recent networks is being increased, and network structures are being become complicated, influences caused by illegal operations have been increased year by year.

Additionally, as open networks have expanded, various kinds of routings are prepared for accessing the networks, and therefore, a possibility of illegal access to the network from non-authorized persons has increased. If the non-authorized persons access the network illegally, it should be difficult to specify any illegally accessed route.

Therefore, a high security system is required for transmission devices, which are structural elements of a network, to prevent from illegally accessing and prevent access-operations by the non-authorized persons.

To have such the security system, the following functions are provided in a conventional security system for a transmission device: first is to check the authorization of a user according to a user ID and a password when the user logs in the transmission device; second is to automatically release a status of log-in for the transmission device when a command is not input during a certain interval; and third is to set a level for an authorized-user at each command so as to give permission to only a user having the level more than specified one.

Consequently, easy logging-in a transmission device is inhibited, and the situation is avoided such that a log-in status where a command can be input is maintained for a long period. Further, there should be limitations in usable commands according to user-levels so that input operations are inhibited which exceed user's authority.

However, since the conventional security system does not inhibit a user from inputting a command, itself, the user can try to input a log-in command, as varying a user ID or a password, respectively. Additionally, since it is difficult to specify a transmission device, to which an illegal operation of inputting a command is executed, a non-authorized person illegally operating can be barely found out before a failure occurs in the network.

Additionally, in the case where after a maintenance operator finishes maintenance operations for a transmission device, he forgets to release the log-in status and is apart from the device, for example, it becomes possible to input commands according to the user level of the maintenance operator until a certain period elapses.

Accordingly, this brings some problems such that log-in operations can succeed by some trials of inputting log-in commands, varying the user ID or password, and illegal operators can not be found out easily.

Alternatively, another problem occurs such that a non-authorized person can control a network illegally by connecting other terminals, after a maintenance operator finishes the maintenance operation. Further, user levels can be set for permission in each command. This means all user are specified and the permission is given to the all users.

SUMMARY OF THE INVENTION

Accordingly, it is an object of the present invention to provide a transmission device with a high security system level, by which the transmission device automatically executes specifying an illegally operated device to inhibit from the illegal operations, preventing a maintenance operator from forgetting to release a log-in status, and setting user levels for permission in each command according to a condition that a maintenance operator sets.

The above-described problems can be solved by the following features:

1) When a cable disconnection is detected at a port for a control terminal or port for a modem provided in a transmission device, or a communication disconnection between modems is detected at the port for the modem, the release of a log-in status, i.e., logs off, is performed where logging in operations are executed for the own device or the other device through respective ports;

2) When failing in inputting a log-in command to a transmission device is made more than specified times, a network address (NSAP) and a device ID of the transmission device, to which the log-in command is input, are reported to all maintenance operators logged in the transmission device;

3) When failings in inputting a log-in command to a transmission device are made more than specified times, a temporal communication status is established among all devices in a network, to which the transmission device is belonging, and a network address (NSAP) and a device ID of the transmission device, to which the log-in command is input are reported to the all devices in the network;

4) The transmission device, in which an illegal access is detected according to the failed log-in command detected by the above-described (2) and (3), informs the detection of illegal operations to a command sender, and the informed device locks an operating port and inhibits from inputting all commands;

5) When a command input from a control terminal linked to the own device specifies a device not existing in the network, or a command is input to a device where a log-in status is not established, the number of operations is counted by detecting error messages of the input commands, and the operating port is locked to inhibit from inputting all commands when the counted number of operations exceeds a prescribed number; and 6) When fulfilling a condition set by a maintenance operator, a transmission device automatically changes settings of user permission levels for command supported by the transmission device to a concurrently specified user level.

Further, other objects of the present invention will become clear by the following descriptions explaining embodiments according to the attached drawings.

BRIEF DESCRIPTION OF THE DRAWINGS

FIG. 4 shows a model of a register 131 when MC68302 is used as a CPU 30 of FIG. 3.

FIG. 5 shows one example of a log-in status management table.

FIG. 8 explains a model of communication data.

FIG. 9 shows one example of a table corresponding to a user ID (UID) or password (PWD) registered in a RAM area 134 of a transmission device 1 of a node A.

FIG. 10 shows one example of a management table for obtaining a device ID or managing a number of failed log-in commands.

FIG. 13 shows one example of a management table for informing a report or device data, i.e., a network address (NSAP) or device ID, from a device, to which the report is not sent.

FIG. 18 shows one example of command responses.

FIG. 19 shows one example of error codes.

FIG. 22 is a second example of creating permitted user levels set by a maintenance man.

FIG. 23 is a third example of creating permitted user level set by a maintenance man.

DESCRIPTION OF THE PREFERRED EMBODIMENTS

Figure 1:
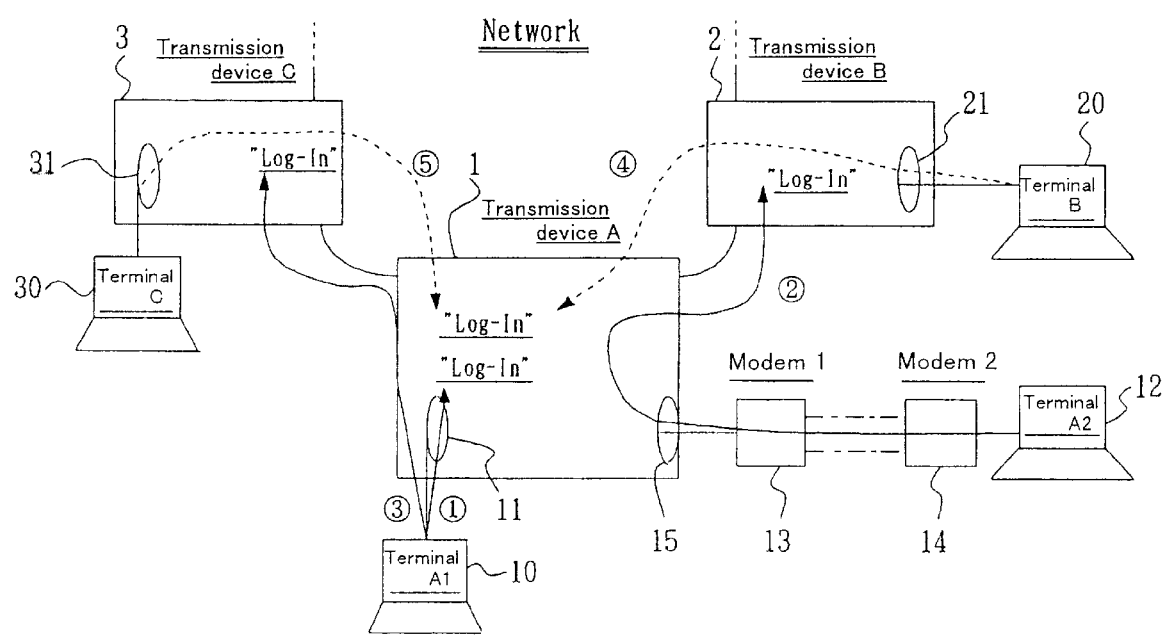
FIG. 1 is an explanatory diagram of a network structure of a fist embodiment according to the present invention.

Throughout the following descriptions, the same reference numerals are used to denote and identify corresponding or identical components.

FIG. 1 shows a network structure of a first embodiment according to the present invention. In FIG. 1, the network is formed with transmission devices (A, B, C) 1, 2 and 3. Control terminals 10, 20 and 30 are respectively connected to the corresponding transmission devices 1, 2, 3 via RS-232C cables, and respectively control the corresponding transmission devices 1, 2 and 3.

Ports 11, 21 and 31 respectively linking to control terminals 10, 20 30 are provided in the corresponding transmission devices 1, 2 and 3. A control terminal (A2) 12 controls the transmission device 1 from a remote location through a public communication line. The control terminal (A2) 12 is connected to a port 15 of the transmission device 1 through first and second modems 13 and 14 provided on the public communication line. In this example, the first modem 13 is physically connected to the port 15 of the transmission device 1 via an RS232C cable.

Figure 2:
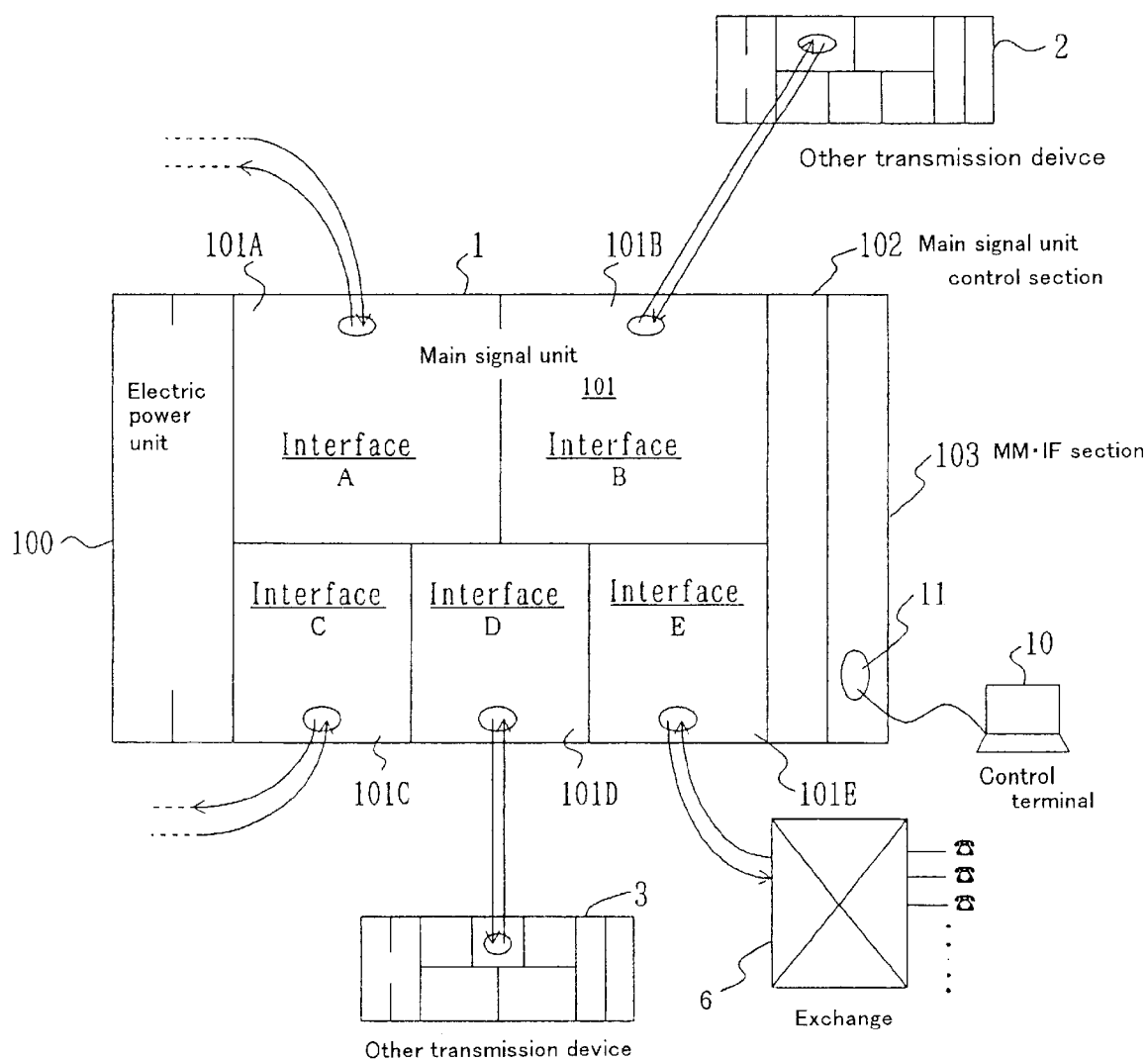
FIG. 2 shows a connection between a transmission device 1 and other devices.

A structural example of transmission devices 1, 2 and 3 will be now explained referring to FIG. 2. FIG. 2 shows connections between a transmission device 1 and other devices, for example. Structures of the other transmission devices 2 and 3 are similar to this structure of the transmission device 1.

The transmission device 1 includes an electric power unit 100; a main signal unit 101, a main signal unit control section 102, and a man-machine interface (M.M IF) section 103. The main signal unit 101 includes interfaces 101A to 101E. In FIG. 2, the interfaces 101B and 101D are respectively connected to the other transmission devices 2 and 3, and the interface 101E is connected to an exchange 6.

The man-machine interface (M.M IF) section 103 includes a port 11 and is connected to a control terminal 10 via the port 11. Internal structures of the main signal unit 101 and the main signal unit control section 102 may be varied according to a corresponding transmission device.

Figure 3:
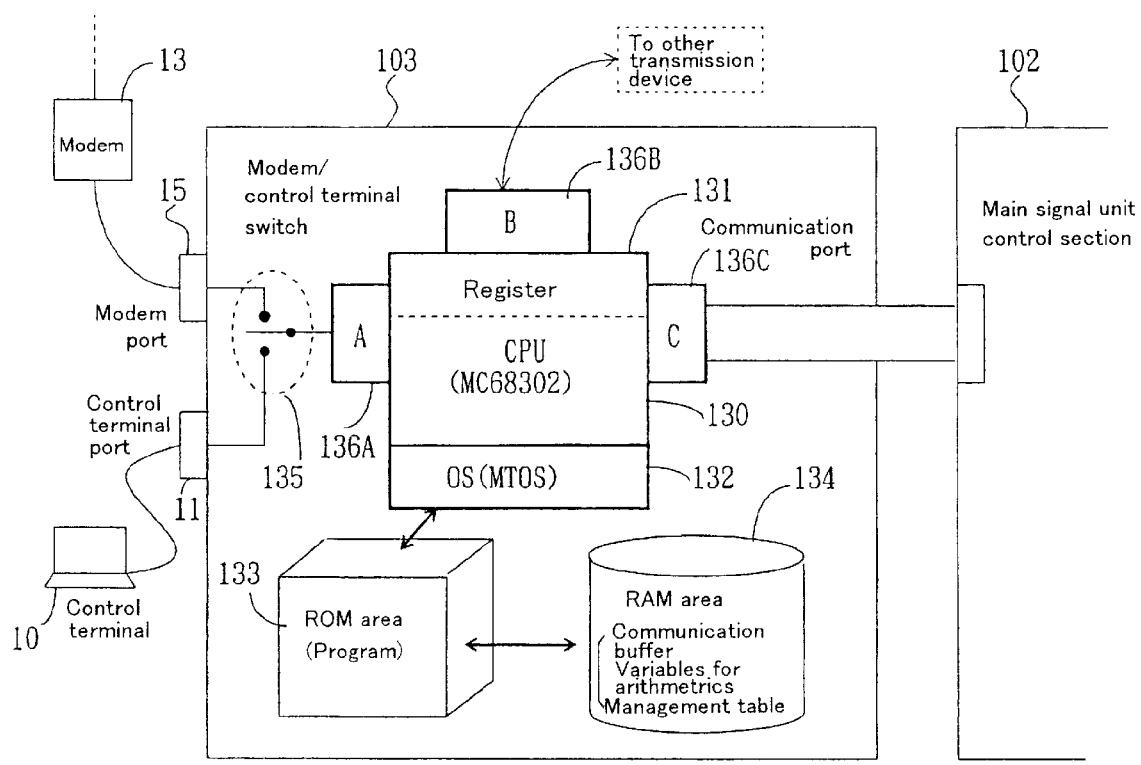
FIG. 3 is a detailed structural example of a man-machine interface (M.M IF) section 103.

FIG. 3 is a detailed structural example of a man-machine interface (M.M IF) section 103. A control circuit in the man-machine interface (M.M interface) section 103 is formed with, for example, a CPU 130, such as MC 68302, including a register 131.

The man-machine interface section 103 is entirely controlled by operation software (OS) stored in a part of a memory area. The section 103 further includes a ROM area 133 and a RAM area 134. The ROM area stores a program for executing the security system according to the present invention, and the RAM area 133 includes communication buffers and stores arithmetic variables and management tables.

Additionally, the section 103 includes plural communication ports 136A to 136C. In FIG. 3, the communication port 136A is linked to a port 11 for the control terminal 10 and a port 15 for the modem 13 through a switch 135. The communication port 136B is connected to another device, and the communication port 136C is connected to main signal unit control section 102.

Returning back to FIG. 1, the structure will be further explained. Software programs are stored in the ROM area 133 of the man-machine interface 103 in the transmission device 1, 2, and 3 in FIG. 3. The software programs are executed by means of a serial communication control (SCC) function provided in the CPU 130 shown in FIG. 3, in the cases where commands are received from, and reports of failure are sent to the control terminals 10, 12, 20 and 30.

A register 131 is prepared for the SCC function. A current status of the communication line (channel) is reflected to the register 131 as an example. FIG. 4 shows a model of the register 131 when MC68302 is used as the above-described CPU 130, for example.

As shown in FIG. 4, the register 131 includes 8 bits of D0 to D7. A DTR/DSR signal for detecting a disconnected cable of a port for a control terminal or a port for a modem is reflected on D0 bit, and a CD signal for detecting a communication disconnection between modems is reflected on D1 bit.

A software program monitors the CTS and DC bits of the SCC status registers 131 corresponding to the each port.

When detecting a cable disconnection or a communication disconnection between modems by monitoring, it is determined to which device and from which port in a network is logged in according to a log-in status management table. FIG. 5 shows one example of the log-in status management table provided in the transmission device 1 at the node A. Then, all of log-in (connection) statuses passed through failures detected ports are released, i.e. logged-off. The log-in status management table is stored in the RAM area 134 of FIG. 3.

In the log-in status management table shown in FIG. 5, nodes A, B and C respectively correspond to transmission devices 1, 2 and 3. Numerals enclosed with circles correspond to those shown in FIG. 1. It is apparent from FIG. 5 that an own node, i.e., the transmission device 1 corresponding to the node A is in a log-in status I, as connected to the control terminal, for example. Further, a log-in status II from the node A to the other nodes and a log-in status III from the other nodes to the node A are shown in FIG. 5.

Figure 6:
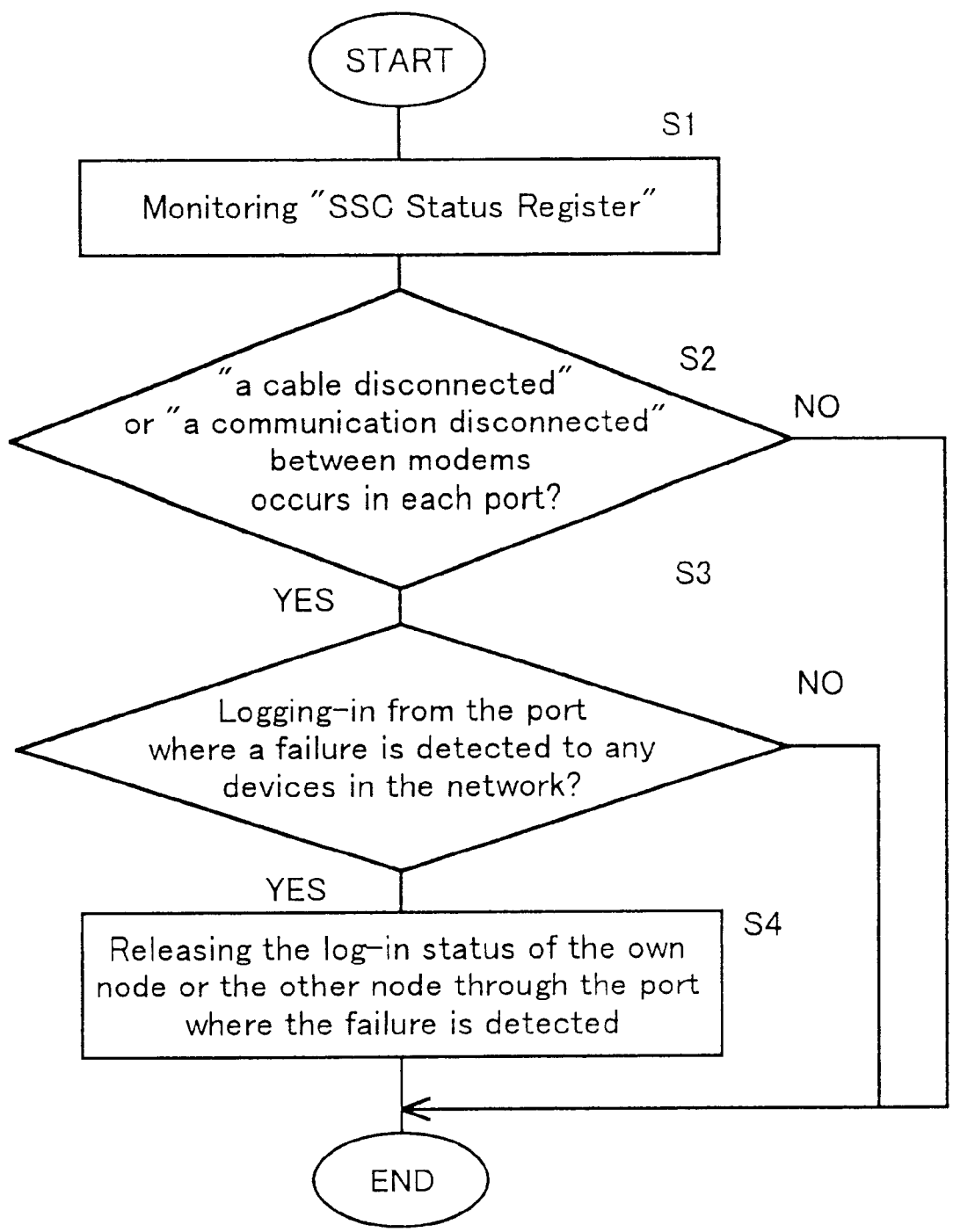
FIG. 6 is an operational flow chart of the first embodiment of FIG. 1.

Operations of FIG. 1 will be now considered in accordance with an operational flow chart shown in FIG. 6. The CPU 130 monitors the SCC status register 131 according to a program stored in the ROM area 133 (STEP S1).

It is judged according to the CTS and CD bits of the SCC status register 133 whether or not a failure, such as a cable disconnection or a communication disconnection between modems, is detected for each port (STEP S2).

When a failure is detected, it is judged to which device in the network is logged-in from the port where the failure is detected referring to the log-in status management table of FIG. 5 (STEP S3). Then, the status of logging in the own transmission device in which the failure is detected or the other devices is released (STEP S4).

Figure 7:
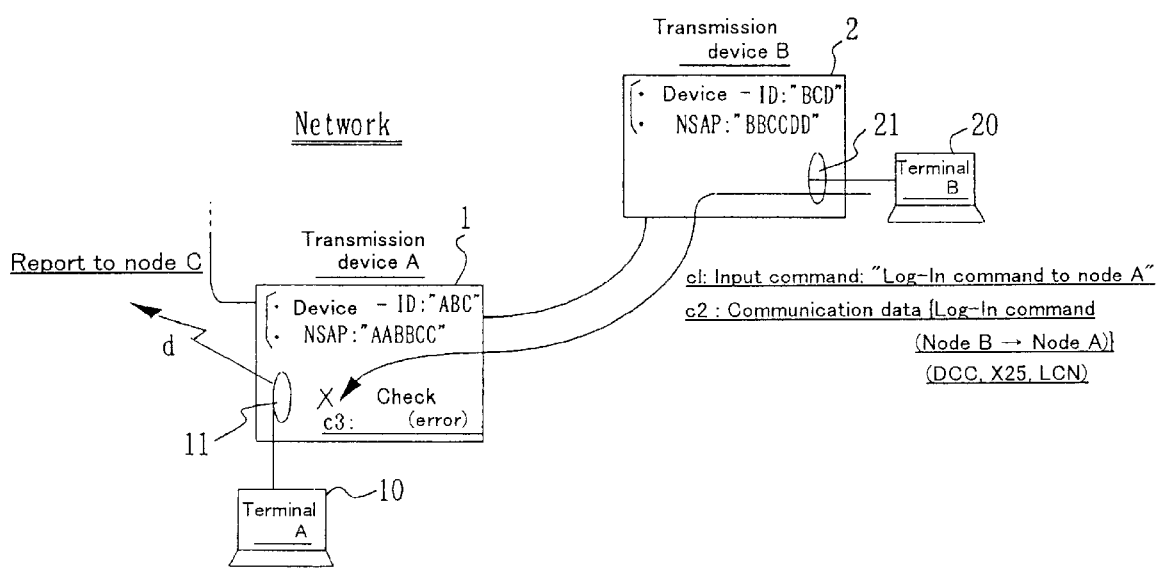
FIG. 7 shows a second embodiment of the present invention.

FIG. 7 shows a second embodiment of the present invention. The transmission devices 1 and 2 forming a network hold device IDs and network addresses (NSAP: Network Service Access Point) for identifying each transmission device in the network.

Same numerals and symbols are used to denote the corresponding components shown in FIG. 1. In FIG. 7, the device ID of the transmission device 1 is "ABC", and that of the transmission device 2 is "BCD". Additionally, the network addresses NSAP of the transmission devices 1 and 2 are, for example, "AABBCC" and "BBCCDD", respectively.

Further, in FIG. 7, c1 to c3 mean a flow of a command input from a node B. At first, a log-in command is inputted from the node B for the log-in to the transmission device 1 at the node A (c1).

The transmission device 2 at the node B converts the input log-in command for logging-in to the transmission device 1 at the node A (c1) into communication data to inform to the transmission device 1 (c2). Then, the transmission device 2 transmits the converted log-in command (c1) to the transmission device 1 as communication data (c2).

Thereby, the communication data is informed to the transmission device 1 via interfaces, such as an inter-device interface (DCC), a public network interface (X. 25) and a local network interface (LCN).

The transmission device 1 checks errors in the transmitted communication data (c3). When detecting a failure, the transmission device 1 at the node A reports the result of the detection to a maintenance operator of the transmission device 3 at a node C (d), for example.

Then, the network addresses (NSAP) for the transmission device 1 to be transmitted and for the transmission device 2 transmitting a log-in command are set as a model of the communication data shown in FIG. 8. The transmission device 1 extracts the log-in command addressed to the own device from the communication data.

The user ID (UID) and password (PWD) specified in the log-in command are checked in reference to the UID/PWD corresponding table (refer to FIG. 9) registered in the RAM area 134 of the transmission device 1.

When a failure is detected (c3), such that an unregistered UID is specified or a combination between UID and PWD is not suitable, as the result of checking, the number of log-in command failure times at the node corresponding to the network address NSAP, of the transmitting device, in the communication data is counted up.

When the counted value of the failure times becomes more than a prescribed allowed failure times, it is judged an abnormal operation has been performed. A report of the illegally operated node is transmitted to all of the logged-in maintenance operators with the obtained device ID according to the network address NSAP of the transmitting device. Thereby, it becomes easy to specify an illegally operated device.

When detecting an illegal operation performed according to the log-in command input from the control terminal 20 connected to the transmission device 2, the network address NSAP of the transmission device 2 is obtained. Then, the device ID is obtained according to the network address NSAP, and a report of the illegally operated node is sent to the maintenance operator.

A management table shown in FIG. 10 is used to obtain the above-described device IDs and to manage the number of the failed log-in commands. The management table is stored in the ROM area 134.

Figure 11:
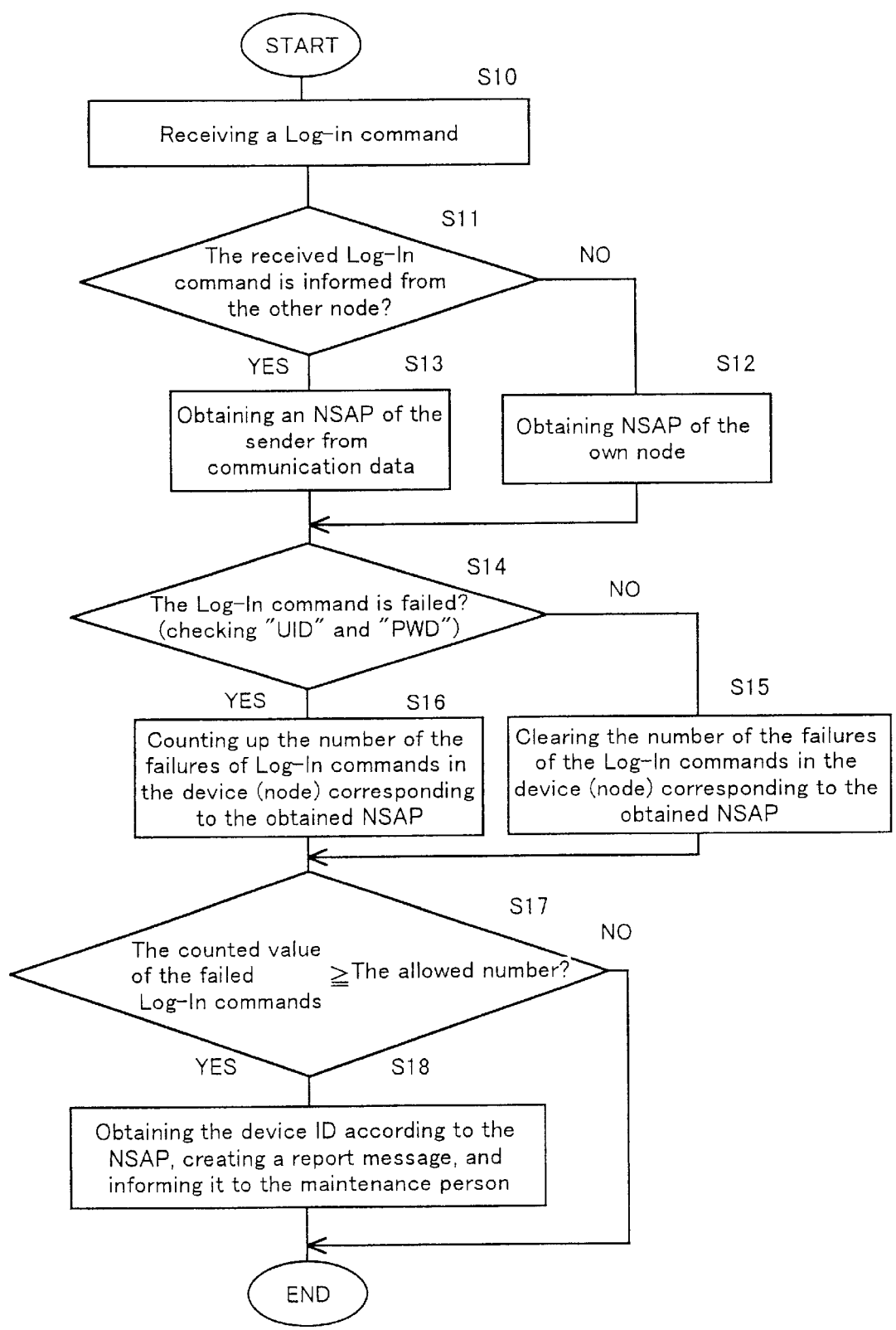
FIG. 11 is a processing flow chart of the second embodiment.

An operational flow chart of the above-described second embodiment is shown in FIG. 11. The operation will be further explained in accompanying with the flow chart shown in FIG. . 11. At first, the transmission device 2 receives a log-in command sent from the control terminal 20 (STEP S10). Then, the device 2 judges whether or not the received log-in command is sent from any other node (STEP S11).

When the log-in command is sent from the control terminal 20 linked to the transmission device 2, the transmission device 2 obtains the own network address NSAP (STEP S12). When the command is sent from the other node, the device 2 obtains a network address NSAP of the sender from the communication data (STEP S13).

Next, the device 2 logs the command in, checks the user ID (UID) and the password (PSW), and judges whether or not the log-in is succeeded or failed (STEP S14). When succeeding in the log-in, the device 2 clears the number of the failed log-in commands of the transmission device corresponding to the obtained network address NSAP (STEP S15).

On the contrary, when failing the log-in, the device 2 counts up the number of the failed log-in commands of the device corresponding to the obtained NSAP (STEP S16). A software counter counts the number of the failed log-in commands. The counted value is registered in the right section of the management table of FIG. 10.

Next, the device 2 judges whether or not the counted value of the failed log-in commands exceed an allowed value (STEP S17). When the counted value exceeds the allowed value, the device 2 obtains the device ID according to the network address NSAP, creates a report message, and informs the report message to the maintenance operator (STEP S18).

Figure 12:
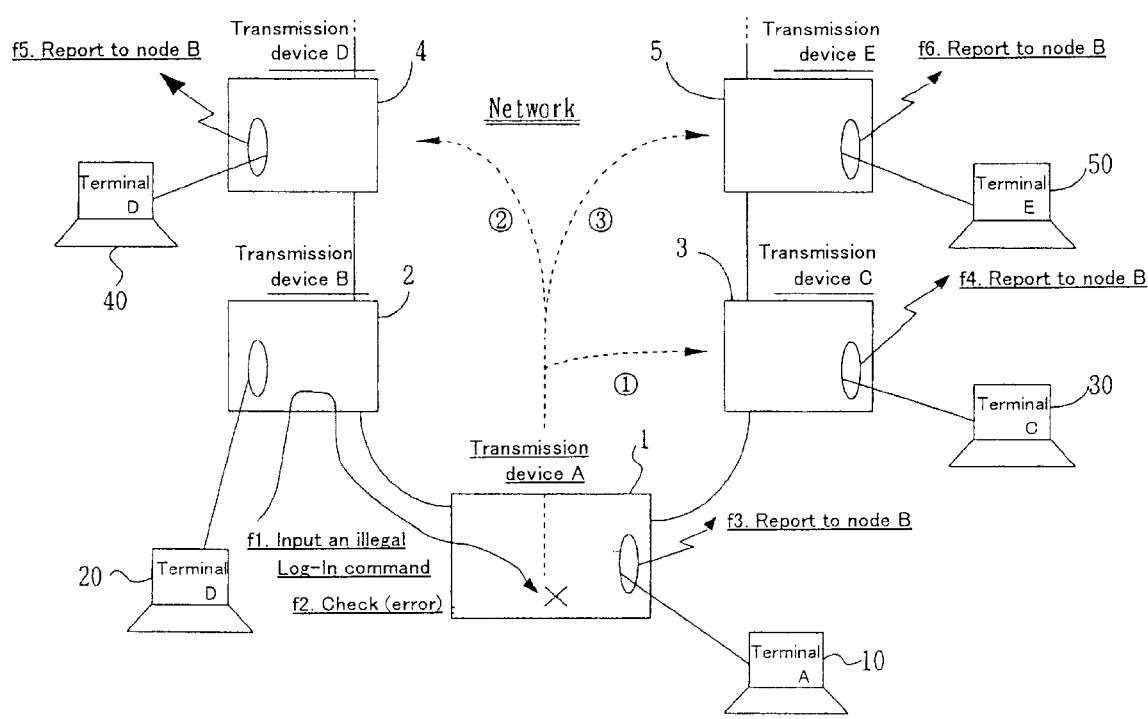
FIG. 12 shows a third embodiment according to the present invention.

FIG. 12 shows a third embodiment of the present invention. In FIG. 12, a network is formed with transmission devices 1 to 5 respectively at nodes A to E. Control terminals 10, 20, 30, 40 and 50 at the node A to E are respectively linked to the transmission devices 1 to 5.

In this example, f1 and f2 mean processes executed by inputting an illegal log-in command f3 means a process for informing a report of illegal operations in an own device, and f4 to f6 mean processes for informing a report of illegal operations in other nodes of the network.

Figure 14:
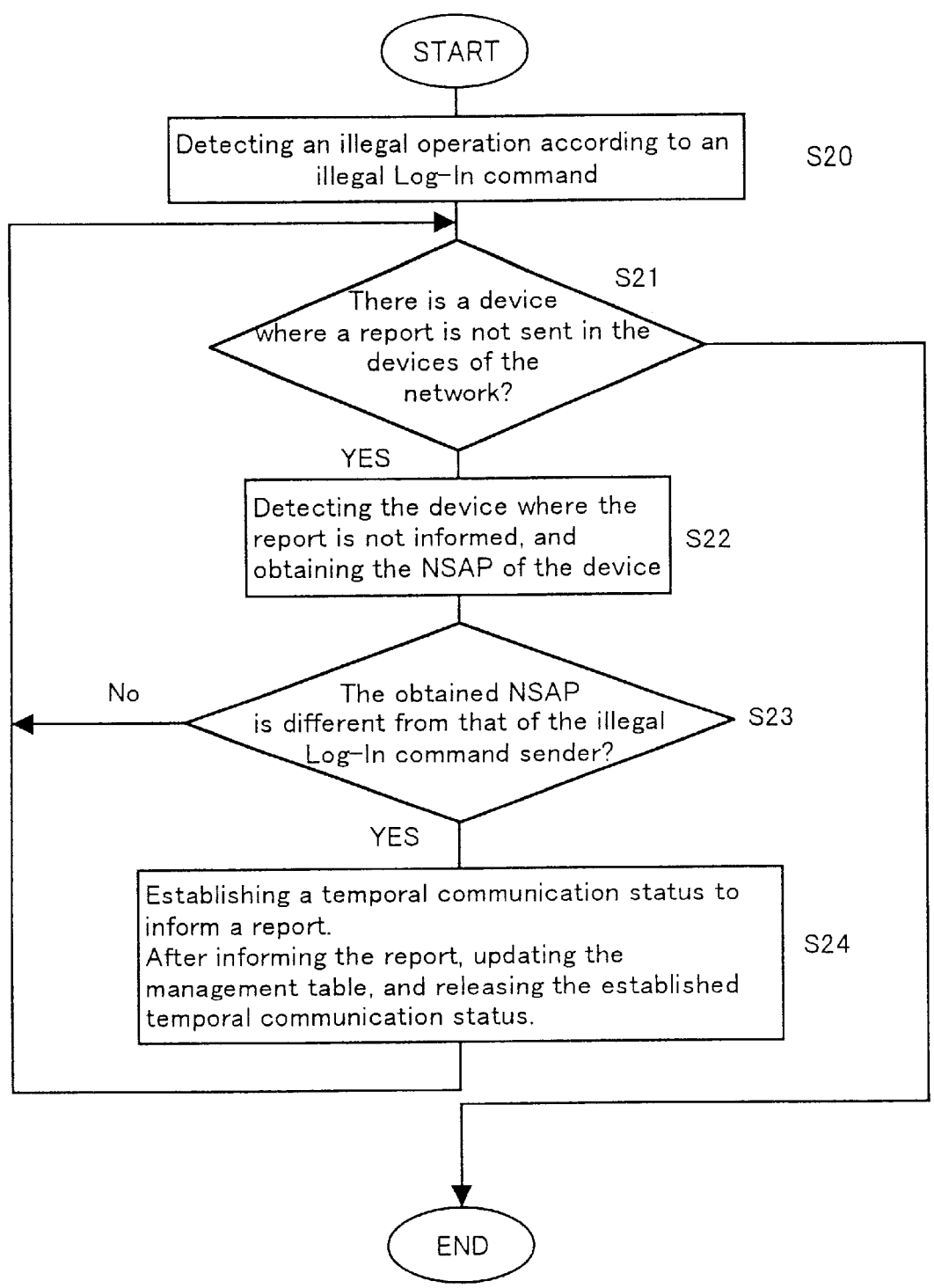
FIG. 14 is an operational flow chart of the third embodiment.

FIG. 14 shows an operational flow chart according to the present invention in the network of FIG. 12. The operation will be now explained in accompanying with the flow chart of FIG. 14. At first, the transmission device 1 at the node A analyzes (f2) a log-in command sent from the transmission device 2 in the node B (f1) (STEP S20).

This detection of illegal operations at the step S20 is executed in the same way as that according to the flow chart of FIG. 11. Then, the device 1 judges whether or not there is a device to which a report is not sent (STEP S21), and obtains data, i.e., the network address NSAP and the device ID, of the device to which the report is not sent (STEP S22).

The device data, i.e., the NSAP and device ID of the device, which has not sent the report, is obtained by referring the management table as shown in FIG. 13. In other words, the network address NSAP of the device, which has not sent the report, is obtained from the devices of the network (STEP s22)

The device 1 compares the network address NSAP of the illegal command sender with that of the device, which has not sent a report (STEP S23). If both of the network address NSAPs are coincident, the device 1 obtains a network address NSAP of a next device in the management table.

When the address NSAP obtained from the management table is different from that of the illegally operated device, a temporal status is established to make communication available between the device 1 of the node A and other nodes according to the address NSAP (refer to (①) of FIG. 12) and to inform a report of the illegally operated device (f3, f4). After informing the report, the status in the management table is changed to "informed", and the temporal status is released (STEP S24).

The same processes for establishing the temporal status (refer to ② and ③ of FIG. 12) and informing a report (refer to f5 and f6) are repeated until all the statuses of informing the report become "informed" (STEP S21).

Figure 15:
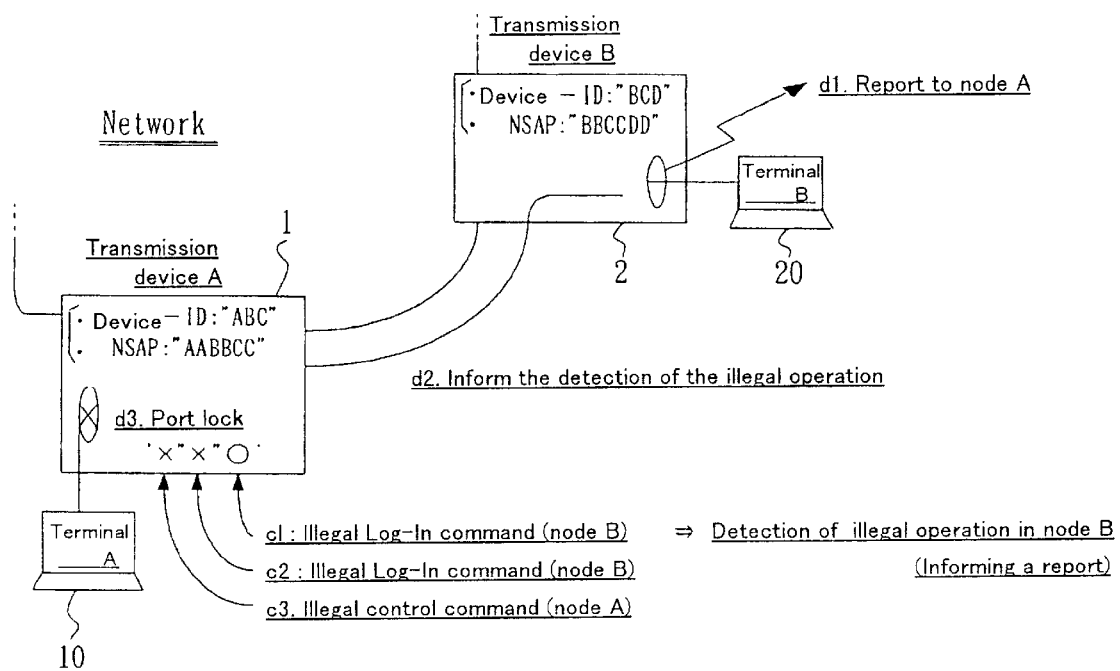
FIG. 15 shows a fourth embodiment of the present invention.

FIG. 15 shows a fourth embodiment according to the present invention. In FIG. 15, reference symbols of control terminals 10 and 20 respectively connected to transmission devices 1 and 2 are the same as those of the second embodiment of FIG. 7.

Reference symbols c1 to c3 mean command inputs to the transmission device 1, and d1 to d3 respectively mean processes of reporting to the maintenance operators when detecting illegal operations, informing to the illegal command sender, and processing due to the information.

In the embodiment of FIG. 7, when an illegal operation caused by an illegal log-in command input (c1) is detected in the transmission device 1, a report is informed to the maintenance operator (d). However, in the embodiment of FIG. 15, the detection of the illegal operations from the transmission device 2 is informed to the transmission device 1 where the illegal operation is concurrently executed (d2).

When this information is received in the illegally operated transmission device 1 at the node A or the device 1 can detect the illegal operation by itself, the device 1 locks the illegally operated port (d3). Accordingly, it becomes possible to prevent from executing illegal operations at the minimum by invalidating all commands input afterward (c2, c3).

Figure 16:
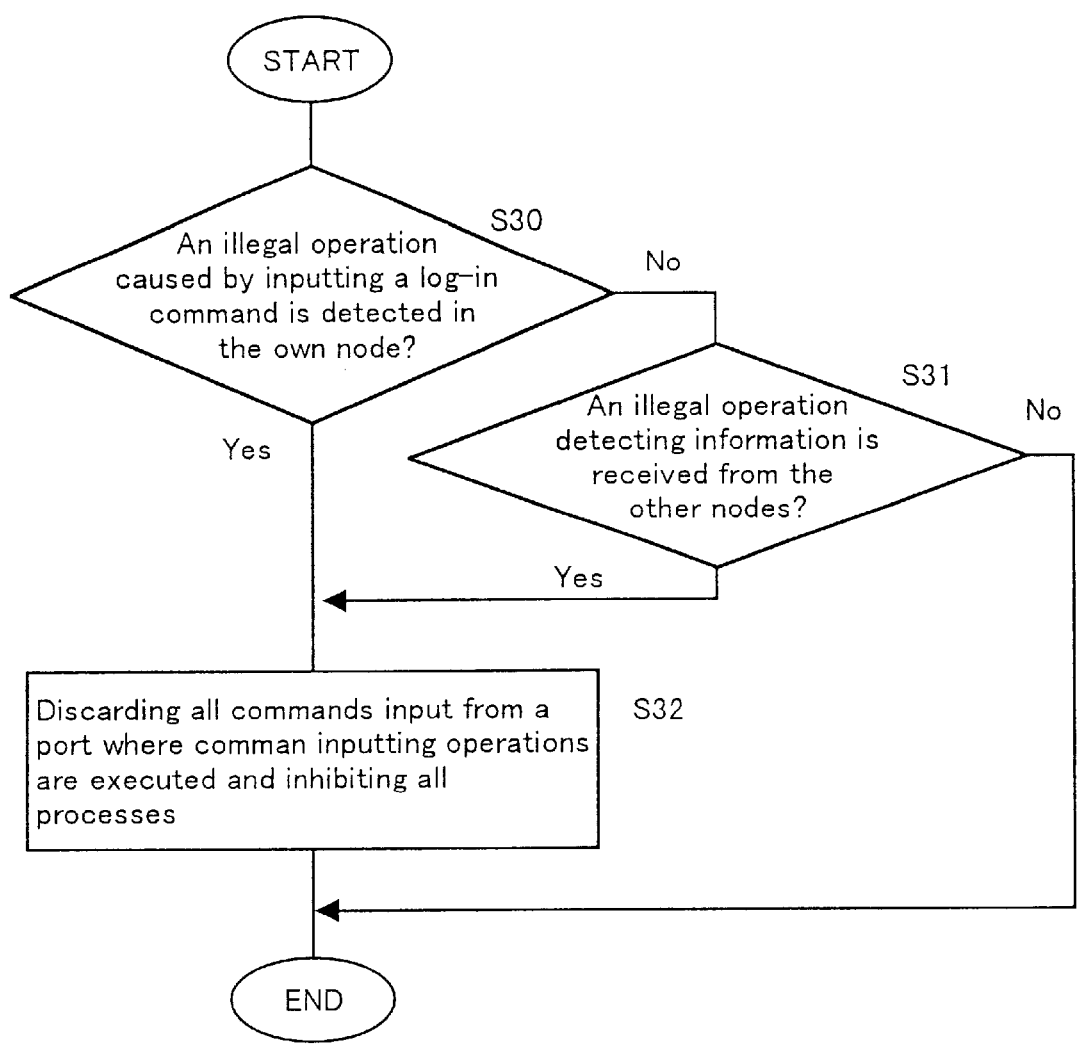
FIG. 16 shows an operational flow chart of a transmission device of a node A in the fourth embodiment.
Figure 17:
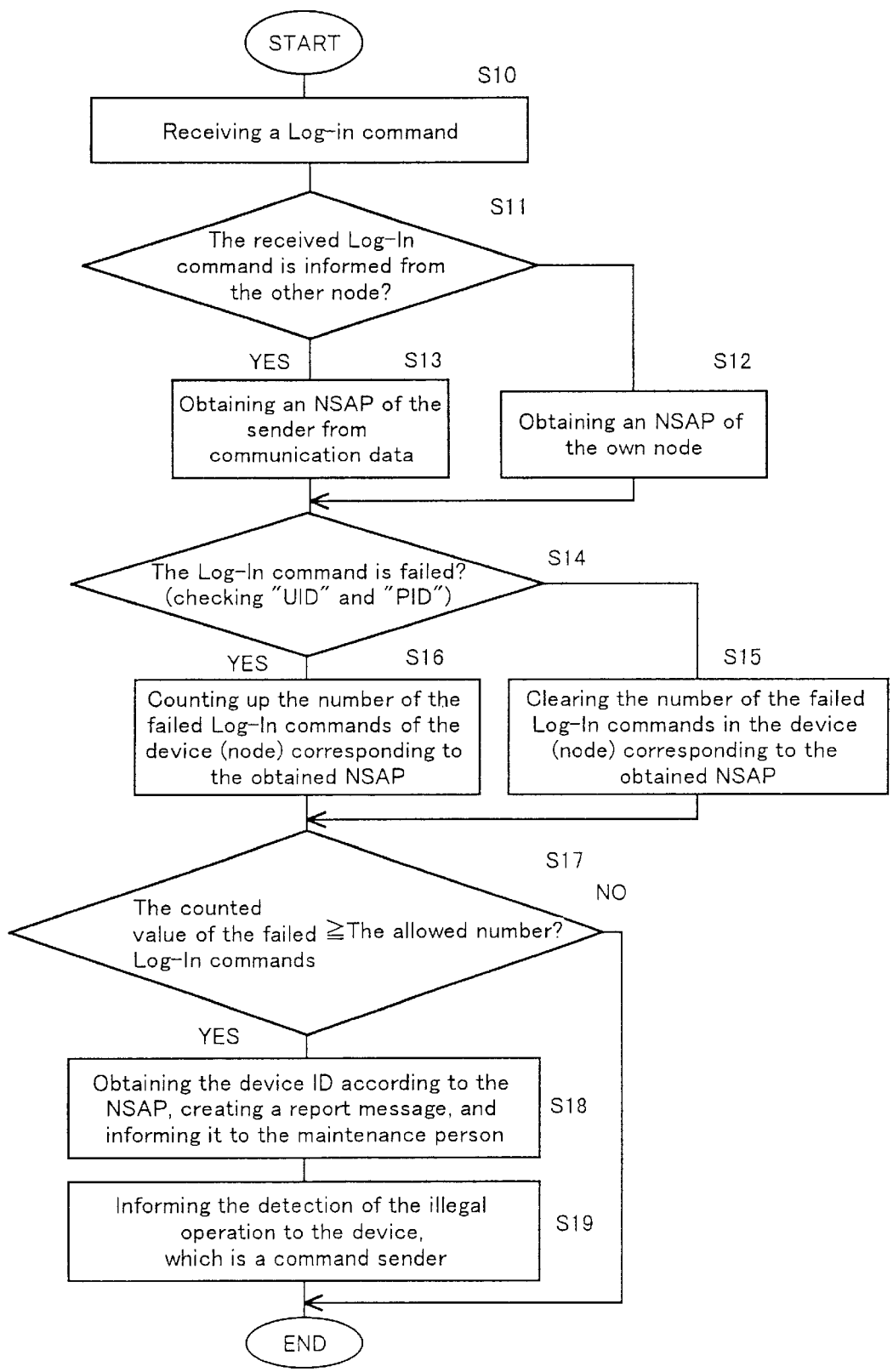
FIG. 17 is an operational flow chart of a transmission device of a node B in the fourth embodiment.

An operational flow chart for locking a port in the transmission device 1 of the fourth embodiment is shown in FIG. 16. FIG. 17 shows an operational flow chart where processes of detecting and informing an illegal operation to the command sender in the transmission device 2 are added to the functions of the second embodiment of FIG. 7.

These processing flow charts will be now explained. In FIG. 16, the transmission device 1 at the node A judges whether or not an illegal operation executed by inputting an illegal log-in command is detected (STEP S30). When the transmission device 1 does not detect any illegal operation performed in the own device, the device 1 judges whether or not an illegal operation detected is informed from the transmitted device 2 (STEP S31).

When the illegal operation is detected in the transmission device 1 or 2, all commands input from a port where illegal command operations are executed are discarded, and all processes are not executed (STEP S32).

In the processing flow chart of FIG. 17, steps S10 to S18 are the same as those of the processing flow chart shown in FIG. 11. In the processing flow chart of FIG. 17, a process (STEP S19) of informing the illegal operation detection to the transmission device, which is a command sender, is added after the step S18.

The added processing step S19 corresponds to an operation (d2) of informing the detected illegal operation from the transmission device 2 to the transmission device 1 in FIG. 15.

Where the command input from the control terminal 10 linked to the device 1 specifies a device not existed in the network, or a control command is input to the device that has not established a communication status, which can be established by a log-in command, the device 1 detects that the illegal operation is executed in the own device by an error message responsive to the input command.

When the number of input illegal operations exceeds a predetermined failure number, the illegally operated port is locked. It is a matter of course that a command for specifying a device not existed in the network can not be received in any device, and therefore, a response to the command can not be also received in any device.

Therefore, the command sender device activates a timer after the device sends the command. When the device can not receive a response within a prescribed interval, the device displays an error message to prepare for inputting a next command.

Further, if the input command becomes an error when a log-in command can be passed, and then, a communication status is established, and an error code indicating an error message and the error cause are informed. However, if the communication status is not established, the error code is not informed, but only the error message is informed.

FIG. 18 shows an example of the command responses including error messages. In FIG. 18, response message codes and meaning for each response message are shown. FIG. 19 shows an example of error codes.

Both are examples of command responses and error codes prescribed by TL1 specification. In the fifth embodiment of the present invention, these command responses or error codes are employed to judge whether or not an illegal operation is detected in the own device.

Figure 20:
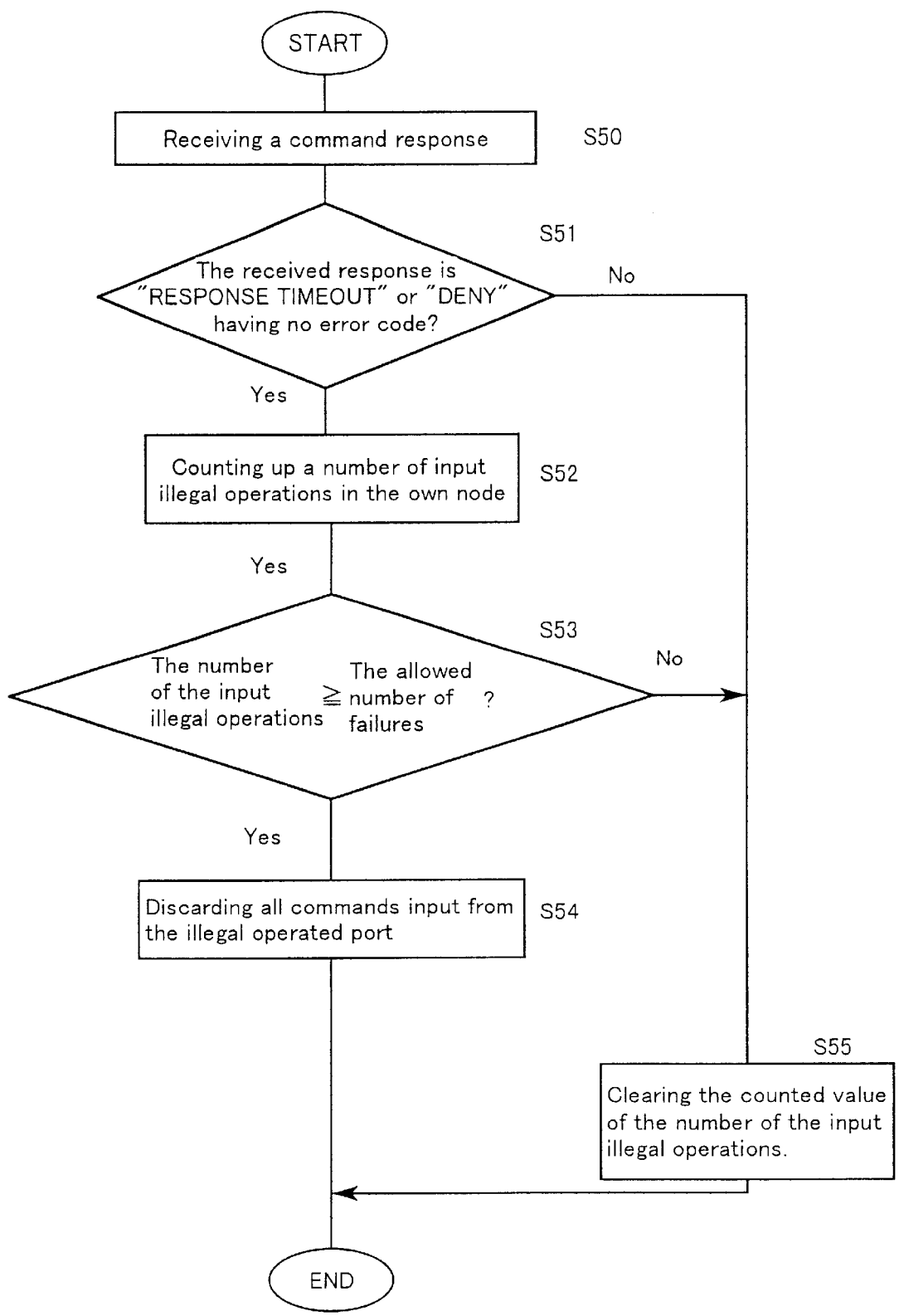
FIG. 20 is an operational flowchart of a fifth embodiment, i.e. a processing flow chart in correspondence to the command response.

FIG. 20 is an operational flow chart corresponding to a command response. In FIG. 20, when receiving the command response (STEP S50), it is judged whether or not the received response is "RESPONSE TIMEOUT"/"DENY" having no error code (STEP S51).

If a result of judgement is "Yes" at the step S51, the device counts up the number of illegal operations input in the own node (STEP S52). It is judged whether or not the counted value of the input illegal operations exceed a predetermined number of failures (STEP S53). When exceeding the predetermined number, all commands input from the illegally operated port are discarded (STEP S54).

When the counted value of the input illegal operations does not exceed the predetermined number at the step S53, the counted value of the illegal input operations is cleared (STEP S55).

In here, a maintenance operator sets a condition, such as "from 8:00 p.m. to 8:00 a.m." or "Saturday and Sunday", and a command type, such as "reference command" or "security concerned command", and a user level adaptable within the specified interval, for example.

The transmission device selects a targeted command from command types, which have been set and creates a management table where permitted user levels are changed. The created management table is used to check the user level for a command input during a period specified by a condition.

When creating the table for managing the permitted user levels according to the settings, there is a case where a user level of specified one of all commands targeted according to the command type is lower than the prescribed user level. Then, the prescribed user level is taken over without changing the user level.

Figure 21:
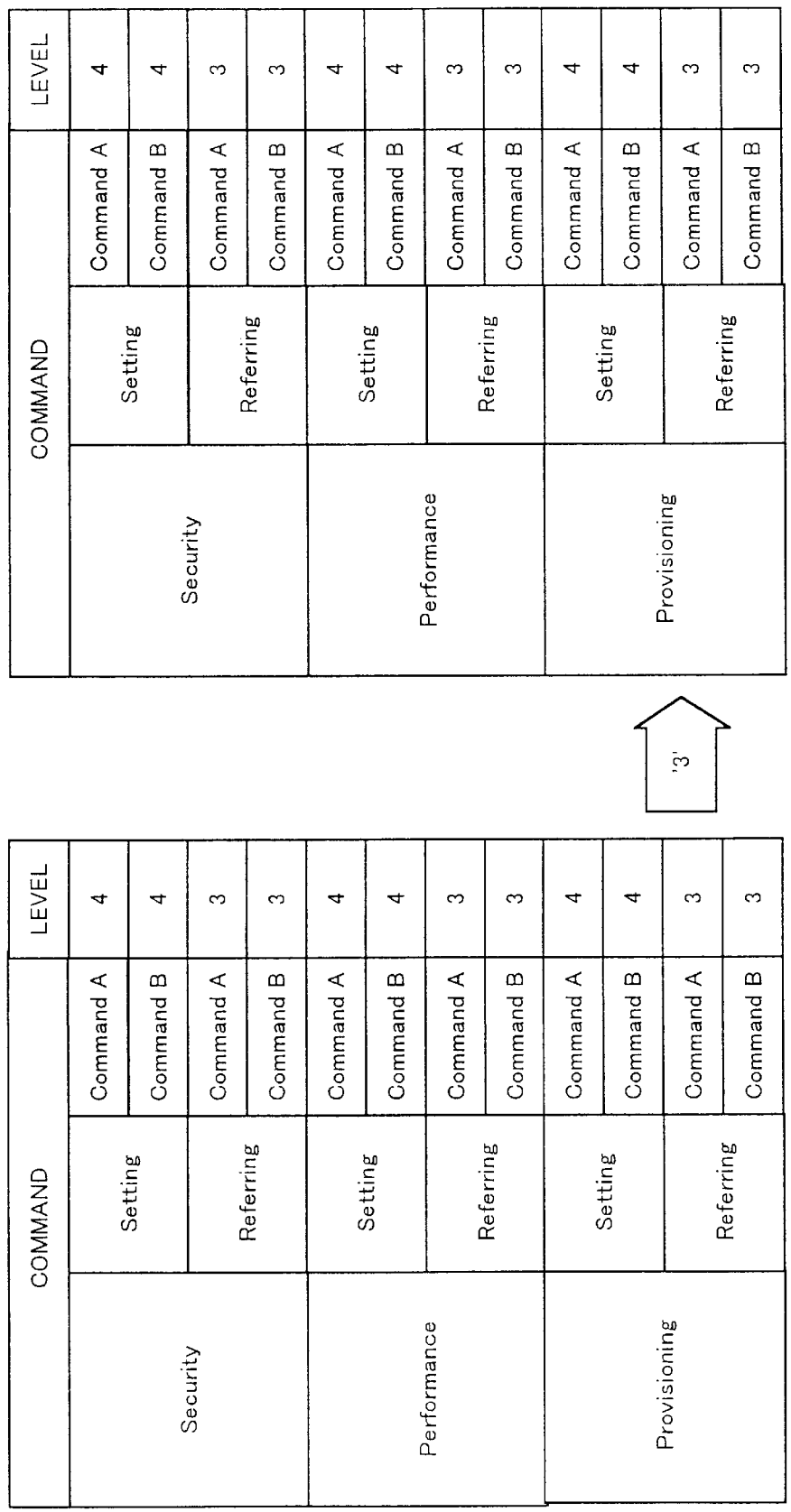
FIG. 21 is a first example of creating permitted user levels set by a maintenance man.

Examples of creating user levels set by a maintenance operator are shown in FIGS. 21, 22 and 23. By using this function, it is possible that only the maintenance operator executes all commands on weekend when other users than the maintenance operator do not use the device by setting a condition, such as "Saturday & Sunday", "all commands" and "only a maintenance operator", for example. Therefore, it becomes possible to give a limitation in executing commands for other users than the maintenance operator.

In other words, in the example shown in FIG. 21, the targeted command is used as a "provisioning concerned command". In FIG. 22, all commands are used as targeted commands. FIG. 23 is an example of set commands.

When setting the levels on the above-described management table, four user levels are set (1 to 4). Level 4 is the top level, and level 1 is the bottom level.

In the present embodiment, a condition for time is used as an example. However, a user ID can be also used as a condition for the command limitation. It becomes possible to prevent from illegal operations over an authority for controlling a device by giving a limitation to a command to adapt the purpose of each user who uses the device.

Figure 24:
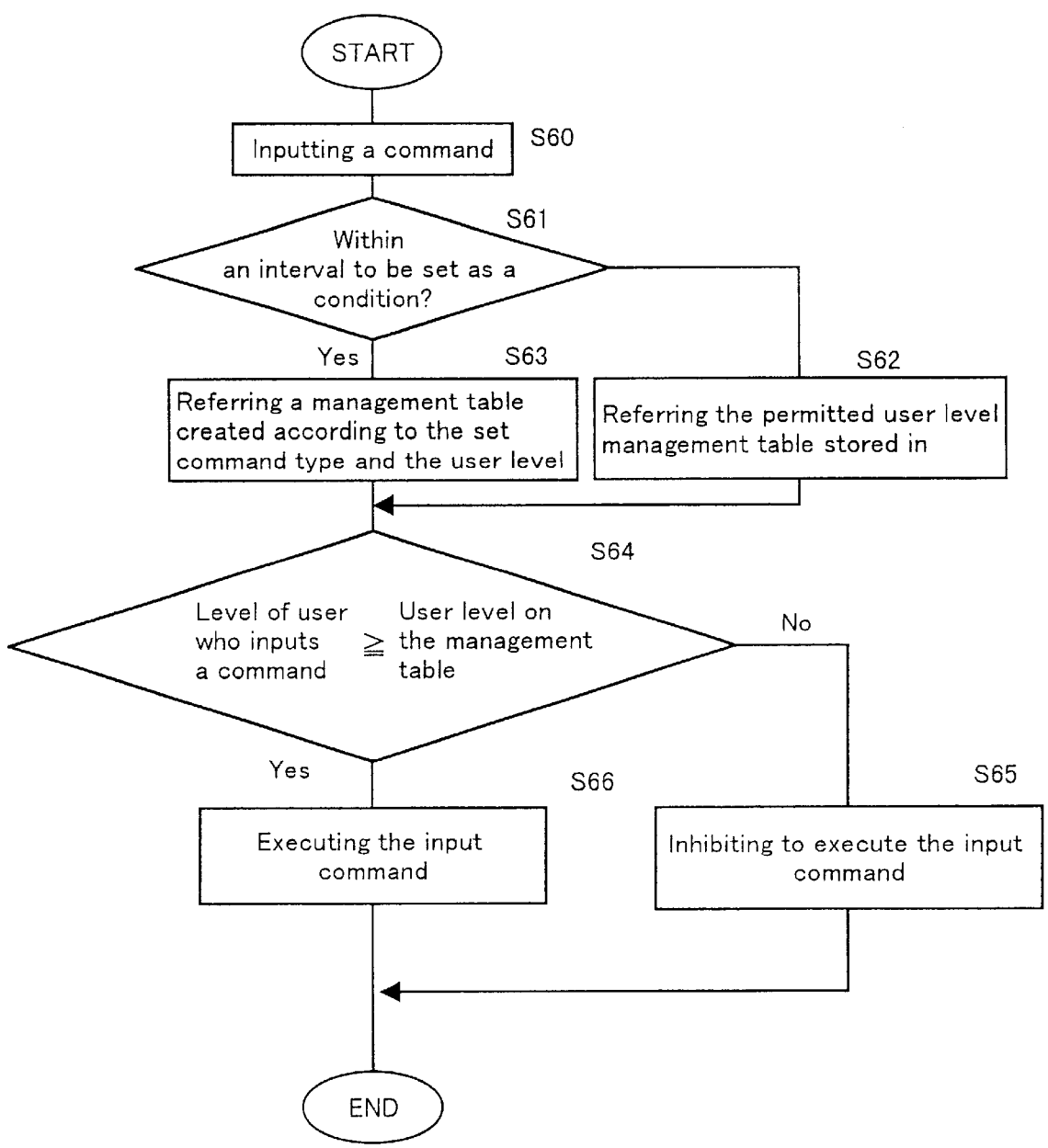
FIG. 24 shows an operational flow chart of a sixth embodiment.

FIG. 24 shows a processing flow chart of processes executed by using the above-described management table. When a command is input (STEP S60), it is judged whether or not the command has been input within an interval to be set as a condition (STEP S61).

If the command is not input within the interval set as a condition, the user level management table maintained is referred (STEP S62). If yes at the step S61, the management table created according to the set command type and user level is referred (STEP S63).

Then, if it is judged that the level of the user who inputs the command exceeds that set in the management table (STEP S64), the input command is executed if the level (STEP S66). On the other hand, when the level does not exceed that set in the management table, the input command is inhibited (STEP S65).

As explained in accompanying with the attached drawings, according to the present invention, it is possible to prevent a maintenance operator from forgetting to unlock the log-in status and prevent the other persons from executing illegal operations.

It is further possible to specify an illegally operated device when the illegal operations are executed and find out illegal operators as soon as possible. In addition, since command input operations are inhibited after an illegal operation is detected, it is possible to make the illegal operation minimum.

The user level for each command can be automatically changed according to a condition set by a maintenance operator, and the limitation can be given to all users other than the maintenance operator. Therefore, the present invention may improve a security system for transmission device.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A network system comprising:
    plural transmission devices connected to each other through a network, each transmission device including:
        a port, to which a control terminal is linked to control the transmission device and
        a management table storing connection status, which indicates to which transmission device and from which port of the transmission device the control terminal has logged-in;
    wherein when a cable disconnection is detected at the port of one transmission device, a log-in status indicated in the management table of the one transmission device is released;
    wherein when one transmission device detects illegal access thereto, the one transmission device determines from which control terminal the detected illegal access is conducted by consulting the management table of the one transmission device, and reports data specifying the determined control terminal to maintenance operators logging in the one transmission device in a network to which the one transmission device belongs.

2. The system according to claim 1,
    wherein the illegal access is detected when a number of failures in inputting login commands to the one transmission device becomes more than a predetermined value, and the one transmission device inputs a network address and a transmission device ID in the data specifying the determined control terminal.

3. The system according to claim 2,
    wherein a temporal communication status is established with all transmission devices connected through the network, to which the one transmission device belongs, so that the data specifying the determined control terminal can be informed to all maintenance operators.

4. The system according to claim 1,
    wherein when the one transmission device reports data specifying the determined control terminal to the maintenance operators logging in to the one transmission device, the one transmission device concurrently informs the other transmission device of the detection of the illegal access performed to the other transmission device, so that the other transmission device locks a port, through which the illegal access is performed, to inhibit all access to the other transmission device.

5. The system according to claim 1,
wherein in each of the plural transmission devices, a permitted user level for commands to be supported is changeable, and is updated according to conditions to be set by a maintenance operator.

* * * * *